United States Patent [19]

Ballies

[11] 4,364,832

[45] Dec. 21, 1982

[54] SEPARATING MEMBER IN A SEPARATING TUBE FOR CENTRIFUGAL SEPARATION

[76] Inventor: Uwe W. Ballies, Jaegersberg 7 - 9, 2300 Kiel, Fed. Rep. of Germany

[21] Appl. No.: 340,044

[22] Filed: Jan. 18, 1982

[30] Foreign Application Priority Data

Jan. 21, 1981 [DE] Fed. Rep. of Germany ....... 3101733

[51] Int. Cl.$^3$ ............................................ B01D 21/26

[52] U.S. Cl. .................................... 210/518; 210/927; 494/16

[58] Field of Search ............... 210/782, 789, 513, 514, 210/515, 516, 517, 518, 927; 233/1 R, 1 A, 26

[56] References Cited

U.S. PATENT DOCUMENTS

| | | | |
|---|---|---|---|
| 3,981,804 | 9/1976 | Gigliello | 210/927 |
| 3,997,442 | 12/1976 | Gigliello | 210/789 |
| 4,147,628 | 4/1979 | Bennett | 210/789 |
| 4,154,690 | 5/1979 | Ballies | 210/927 |

*Primary Examiner*—Ernest G. Therkorn

*Attorney, Agent, or Firm*—Cushman, Darby & Cushman

[57] ABSTRACT

A separating tube (2) preferably made from a plastics material for centrifugal separation of a liquid containing at least two components and preferably blood is provided, in which an asymmetrically shaped separating member (6) serves to separate the two components. The separating member (6) has a specific gravity between that of the two components to be separated. As a result of the asymmetrical shape, the center of gravity (S) of separating member (6) is eccentrically positioned with respect to axis (M) of separating tube (2), so that the separating member (6) is rotated or tilted during centrifuging. At least one gap (f) is formed through which one of the two components reaches the top of separating member (6). At the end of the centrifuging process, the bouyancy of the heavier component rotates separating member (6) back into its original position in which it seals off separating tube (2). FIG. 4 is intended for publication with the summary.

12 Claims, 16 Drawing Figures

4
8
7
6
L
S
10
e
M
2

4
8
f
f
7
L
10
S
6
2
5
A 4
8
2
7
10
6
5

(I)

(II)-(IV)

(V)

Fig. 16
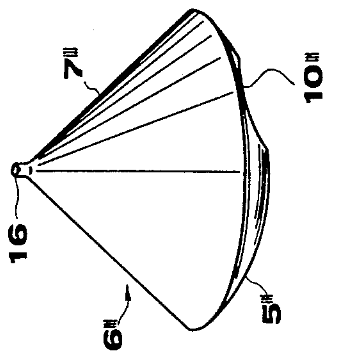
Fig. 15
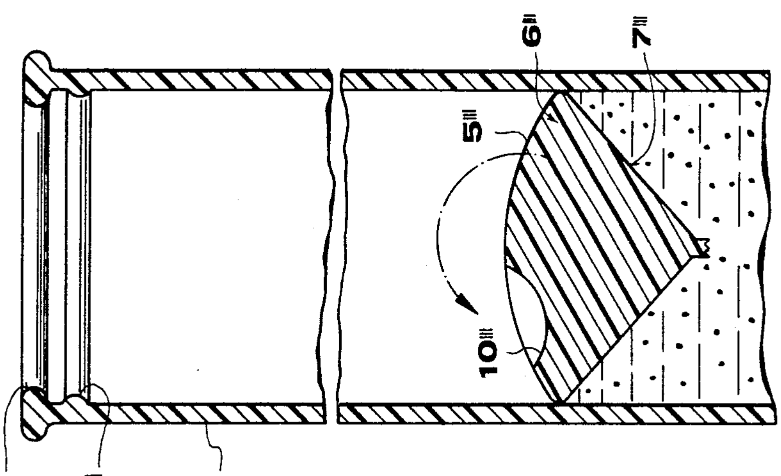
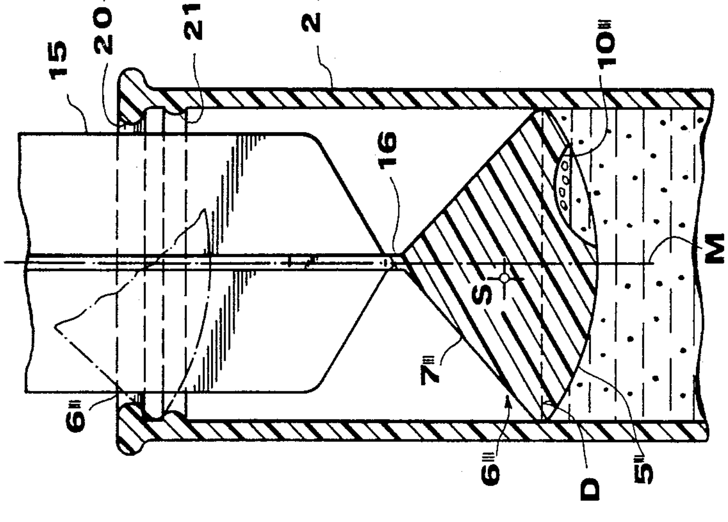
Fig. 14

SEPARATING MEMBER IN A SEPARATING TUBE FOR CENTRIFUGAL SEPARATION

The invention relates to a separating member in a separating tube for the centrifugal separation of a liquid containing at least two components, which has a top surface and a bottom surface and is made from inelastic material, particularly inelastic plastic material, whose specific gravity is between that of the components to be separated and which in the rest state seals the cross-section of the separating tube.

Such a separating tube is already known from DE-OS 2,711,336, in which a substantially cylindrical polystyrene separating member is placed in a plastic separating tube. During centrifuging, the separating tube diameter is widened somewhat due to compression, whereas the rigid plastic separating member does not change shape. This leads to an annular clearance between the separating member and the inner wall of the separating tube, so that under the influence of the centrifugal force the separating member moves towards the bottom of the separating tube. The lighter components pass through the annular clearance into the space of the separating member, which is deposited on the heavier component. At the end of centrifuging, there is once again a close engagement between the inner wall of the separating tube and the separating member leading to the closure of the annular clearance, so that a complete separation of the two components is achieved and maintained.

A disadvantage of the known separating tube is that it cannot be made from a material which, during centrifuging, does not expand in the radial direction, so that glass tubes cannot be used for this purpose.

The problem of the present invention is to improve the known separating tube in such a way that, during centrifuging, a gap is still formed between the separating member and the separating tube wall, if the latter is made from a material which does not expand.

According to the invention, this problem is solved by a separating tube of the aforementioned typed, which is characterized in that the centre of gravity of the separating member is arranged eccentrically with respect to its axis and that due to its shape, during centrifuging, the separating member can only be tilted in the separating tube in such a way that a gap is formed between the largest circumference of the separating member and the inner wall of the separating tube.

As a result, the separating member tilts during centrifuging in the separating tube and consequently forms a gap through which the lighter component can pass from the bottom to the top of the separating member.

Preferably, the separating member is shaped like an asymmetrical frustum, whose largest diameter $D_1$ is twice as large as its smallest diameter $D_2$, the two diameters $D_1$ and $D_2$ being connected by a generatrix of the separating member positioned vertically on both the largest diameter $D_1$ and the smallest diameter $D_2$. In cross-section or in elevation, such a separating member is trapezoidal. With respect to the axis of the separating tube, the centre of gravity of the separating member is positioned eccentrically, so that during centrifuging the separating member is tilted in such a way that the centre of gravity migrates towards the central axis M of the separating tube. The separating member is in contact by two diametrically opposite points with the inner wall of the separating tube and forms two crescent-shaped gaps for the passage of the components to be separated.

Overturning of the separating member is prevented through one point of the bottom surface being in contact with the separating tube wall in one extreme or end position.

According to another embodiment of the invention, the separating member is shaped like a cylindrical portion with a circular top surface, which is perpendicular to the generatrix of the cylindrical portion and seals the separating tube diameter in the rest state. The circumference of the cylindrical portion is smaller than a semicircle, so that the separating member can tilt during centrifuging.

The underside of the top surface is preferably bevelled towards the bottom surface of the separating member, so that no air can remain enclosed under the separating member.

To prevent an overturning of the separating member a separating wall is provided on the underside of the free top surface having an edge which, in the rest position of the separating member, is at an angle to the separating tube wall. When the separating member is in an end position, said separating wall edge comes into contact with the separating tube wall and prevents a further tilting or rotary movement.

According to a further embodiment of the invention, the separating member is conical with a spherical shell-shaped bottom surface, the height of the cone engaging on the spherical shell-shaped surface being smaller than half the diameter of the separating tube. If, during centrifuging, the cone points upwards, the centre of gravity is above the largest diameter of the separating member and as a result the latter has an unstable position, so that it will rotate and bring the apex of the cone in a downwards direction.

According to a preferred embodiment of the invention, the separating member is shaped by means of a predetermined breaking point on a piston rod so that, prior to centrifuging, it can be used in the manner of a syringe plunger. After raising the syringe, the piston rod is stopped to which end, in the case of a conical separating member, additionally two spaced tori are shaped onto the inner wall of the separating tube in the vicinity of its upper end. These tori form bearing blocks for stopping the piston rod. According to another embodiment, said bearing block is formed by the separating tube wall.

The tilting or rotary movement of the separating member is also aided by the fact that, according to a preferred embodiment, at least one bouyancy chamber is provided which, prior to centrifuging, encloses air in the position of rest of the separating member.

Preferably, the bouyancy chamber is arranged in an area diametrically facing the centre of gravity, so that the bouyancy force aids the action of the centrifugal force acting in the centre of gravity during the rotation of the separating member.

The slope of the bouyancy chamber wall is chosen in such a way that although air can be enclosed in the rest state, during centrifuging it entirely passes out of the bouyancy chamber, so that after centrifuging there is no air in the area of the separating layer between the two components and which could have a disadvantageous effect thereon.

Further advantageous developments of the invention can be gathered from the subclaims and the following description of the drawings:

The invention is described in greater detail hereinafter relative to non-limitative embodiments and the attached drawings, wherein show:

FIG. 1 a sectional view of an embodiment prior to centrifuging.

FIG. 2 a sectional view according to FIG. 1 during centrifuging.

FIG. 3 a sectional view according to FIG. 1 after centrifuging.

FIG. 4 a sectional view according to FIG. 1 for representing the movement sequence on passing from the rest position of FIG. 1 into the end position according to FIG. 3.

FIG. 5 the position of the separating tube according to FIG. 1 prior to centrifuging.

FIG. 6 the position of the separating tube and separating member during centrifuging.

FIG. 7 the position of the separating tube and separating member at the end of centrifuging.

FIG. 8 a perspective view of the separating member according to FIGS. 1 to 7 without a bouyancy chamber.

FIG. 9 a sectional view of the separating member of FIG. 8 shaped onto a piston rod.

FIG. 10 a further construction of the separating member according to FIGS. 1 to 9.

FIG. 11 a sectional view of the separating member according to FIG. 10 broken off from the piston rod.

FIG. 12 another construction of a separating member in perspective view.

FIG. 13 a sectional view of the separating member according to FIG. 12.

FIG. 14 a sectional view of another construction of the separating member shaped onto a piston rod.

FIG. 15 the separating member according to FIG. 14 broken off from the piston rod after centrifuging.

FIG. 16 a perspective view of the separating member according to FIGS. 14 and 15.

FIGS. 1 to 3 show a construction of a separating member 6 during the individual phases of the centrifuging process. In the drawings, a separating tube 2 is shown in the horizontal position, which is frequently adopted during centrifuging. The separating tube 2 is, for example, made from a plastics material or glass and is initially sealed by a stopper 4. By means of a connecting member 8, a separating member 6 in the form of an asymmetrical body is with an eccentric centre of gravity S fitted to the underside of the stopper 4. The two components or phases to be separated are indicated by short lines or dots, the former indicating the liquid phase and the latter a heavier, e.g. solid phase dispersed therein. The connecting member 8 is, for example, an adhesive layer whose bond with the separating member 6 is broken as a result of the action of centrifugal force. The separating member 6 shown in FIGS. 1 to 9 has a circular top surface 7 and an also circular bottom surface 5, which are in parallel planes. The circular top surface 7 has the same external diameter $D_1$ as the internal diameter of separating tube 2, whilst diameter $D_2$ of the bottom surface 5 is half as large as the top surface diameter $D_1$. The distant between bottom surface 5 and top surface 7 corresponds to the height of separating member 6 which, in cross-section, is shaped like a right-angled trapezium. In the rest state according to FIG. 1 a generatrix of the separating member 6 is located on the wall of the separating tube 2, whilst the diametrically facing generatrix connecting top surface 7 and bottom surface 5 passes from the inner wall of separating tube 2 to the separating tube axis M. Due to the shaping of separating member 6 its centre of gravity S is not located in the separating tube axis M, but is arranged eccentrically with respect thereto by amount e.

The separating member shown in FIG. 1 also has in its half facing the centre of gravity S, at least one bouyancy chamber 10, which encloses air L in the state of rest according to FIG. 1.

FIG. 2 shows the state which occurs after the centrifugal force has acted for a certain time, the separating member 6 having been detached from connecting member 8 and a partial separation of the two phases having taken place through gap f between separating member 6 and the tube wall as a result of the tilting of the separating member. This tilting or rotation of separating member 6 is brought about in that on the one hand the centrifugal force acting in the centre of gravity S attempts to rotate the latter in the separating tube axis M. The rotary movement is indicated by arrow A. Simultaneously, a bouyancy force acting in the bouyancy chamber 10 functions in the opposite direction to the action of the centrifugal force, so that a pair of torques is formed, which aids the rotary movement of separating member 6 in the direction of arrow A. During tilting or rotating, the separating member 6 is supported on the inner wall of separating tube 2 on two diametrically facing points which, on the circumference of top surface 7 are located in the normal plane passing through separating tube axis M on the sectional or drawing plane.

During further centrifuging, the liquid phase moves past the separating member 6, which slides in the direction of the tube bottom and finally, according to FIG. 3, floats on the heavier phase. As a result of the bouyancy on immersion in the heavier phase, the separating member 6 is rotated back into the initial position in which it seals off the diameter of separating tube 2. The air L enclosed in bouyancy chamber 10 prior to centrifuging is completely discharged during centrifuging, so that in the end position according to FIG. 3, none of the restoring bouyancy force acts against the heavier phase. In addition, no air is enclosed in the bouyancy chamber 10, which would disadvantageously influence the heavier phase.

Separating member 6 can be made from a random material, particularly plastic. It can be solid, hollow or filled with additional weights. Bouyancy chamber 10 can be open towards the periphery of separating member 6. According to another construction, the bouyancy chamber is enclosed and contains a granular material as an additional bouyancy member. When separating blood, preference is given to the use of a separating member made from a glass-hard, light-weight plastics material, preferably polystyrene, which has a specific gravity of $\sim 1.045$, i.e. it is lighter than the erythrocyte layer with a specific gravity of $\sim 1.09$ and somewhat heavier than the plasma or serum layer, whose specific gravity is $< 1.04$ to 1.045.

FIG. 4 illustrates the action and arrangement of bouyancy chamber 10 by means of five positions of the separating member 6 during centrifuging which, for reasons of clarity, are shown one above the other in a separating tube 2. In the drawing, a normal line N is assumed to be placed on separating tube 2 and/or separating tube axis M, with respect to which is given the angles of the chamber wall slope $\alpha_{I-V}$ and the top surface slope $\beta_{I-V}$.

In the initial or rest state according to FIG. 4I, separating member 6 is hung by means of connecting member 8 on stopper 4. Its top surface 7 is parallel to the normal line N of separating tube 2, so that the top surface slope $\beta_I$ is 0° with respect to the normal line N. Bouyancy chamber 10 is filled with air $L_I$. In part, there is also liquid $W_I$ in bouyancy chamber 10 and in fact the position of the liquid level is defined by the right-hand upper edge of chamber 10 in FIG. 4I. The bouyancy chamber 10 is shaped in such a way that during moulding it can be removed from the mould in a sloping manner to the right. For this purpose, the chamber opening must at least have the same diameter as the rest of the chamber in order to permit the use of an unsplit mould. In the case of a bouyancy chamber with a smaller chamber opening then the internal diameter of the chamber it is necessary to use a split mould in the production of the separating member.

FIG. 4II shows the position of separating member 6 following the start of centrifuging, a gap $f_{II}$ being formed by rotation in the direction of arrow $A_{II}$.

In FIG. 4II, this is a counterclockwise rotation. Part of the air $L_{II}$ enclosed in bouyancy chamber 10 can now escape through gap $f_{II}$, whilst liquid $W_{II}$ flows into bouyancy chamber 10. The chamber wall slope $\alpha_{II}$ is smaller than in FIG. II, whereas the top surface slope $\beta_{II}$ has increased.

In FIG. 4III, separating member 6 has been rotated to such an extent by pivoting in the direction of arrow $A_{III}$ that the chamber wall slope has come into a negative area with respect to the normal line N. The liquid $W_{III}$ subsequently flows into bouyancy chamber 10 and thereby displaces all the air $L_{III}$ and the bouyancy due to air L which has previously existed in the right-hand of separating member 6 is discontinued. In this position, the top surface slope $\beta_{III}$ is at a maximum, whereas the chamber wall slope $\alpha_{III}$ has its greatest negative value of e.g. 5 to 20 and preferably 10°.

In the case of further downward movement of separating member 6 in separating tube 2 according to FIG. 4IV, a bouyancy force B caused by the immersion in the heavier phase acts counter to the rotation direction of arrow $A_{III}$, so that separating member 6 rotates back in the direction of arrow $A_{IV}$ and consequently the size of gap $f_{IV}$ is reduced. The chamber wall slope $\alpha_{IV}$ again passes into the positive range, i.e. below normal line N, whilst the top surface slop $\beta_{IV}$ is reduced again.

In the end position according to FIG. 4V, the separating member 6 floats on the heavier phase and has again sealed separating tube 2. Top surface 7 is again located parallel to normal line N, so that the top surface slope is $\beta_V=0$. The chamber wall slope $\alpha_V$ has again reached its maximum value and we obtain $\alpha_V=\alpha_I$. It is now completely free from air and entirely filled with liquid $W_V$, which constitutes the heavier phase.

FIG. 5 shows the hung-in separating tube 2 prior to centrifuging, the centrifuge axis being designated C. The speed of the centrifuge is $V_I=0$.

FIG. 6 shows the separating tube 2 during centrifuging and at rotational speeds $V_{II-IV}$, corresponding to the separating member positions II–IV in FIG. 4.

Figures 1, 2, 3:
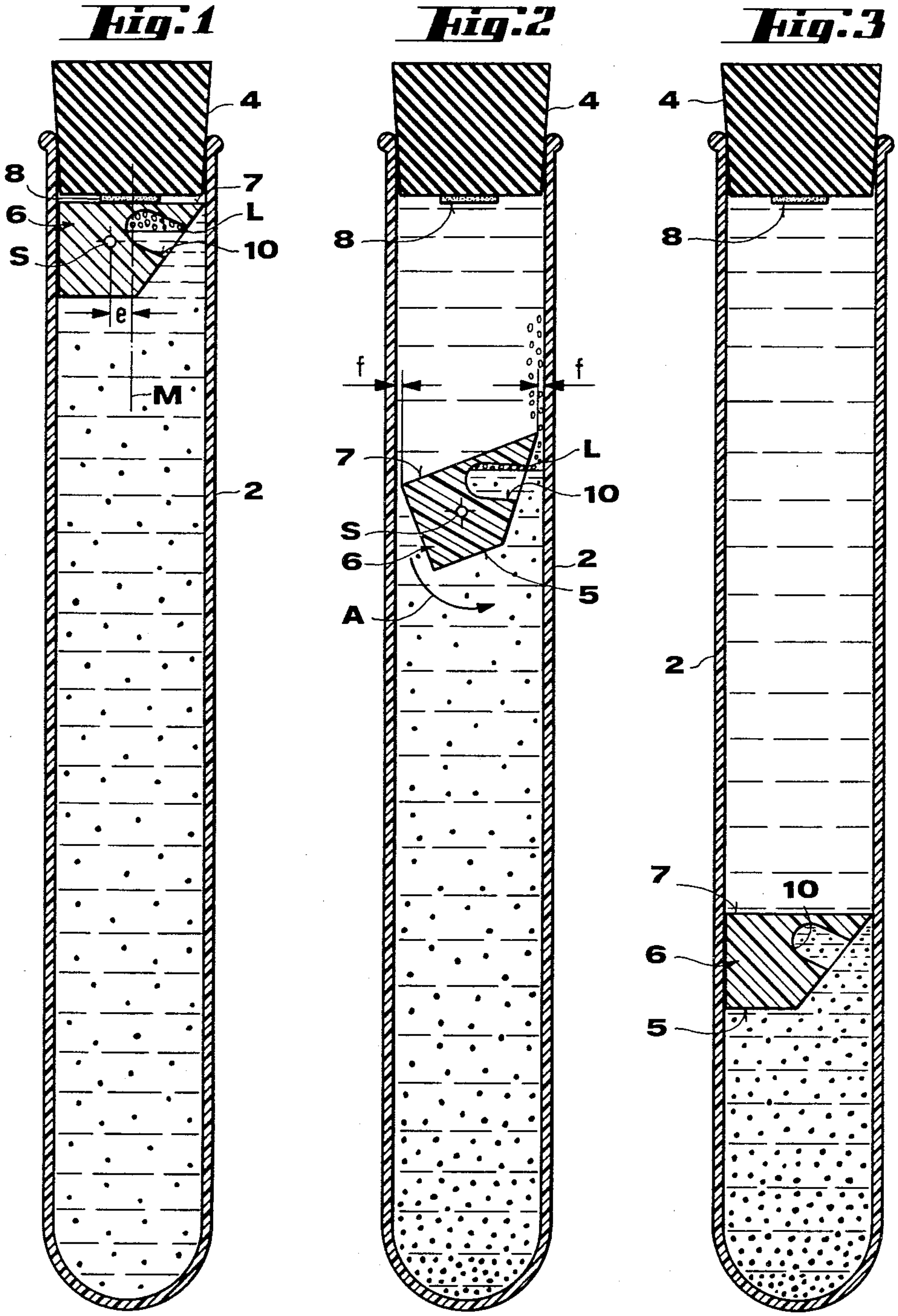
Figure 4:
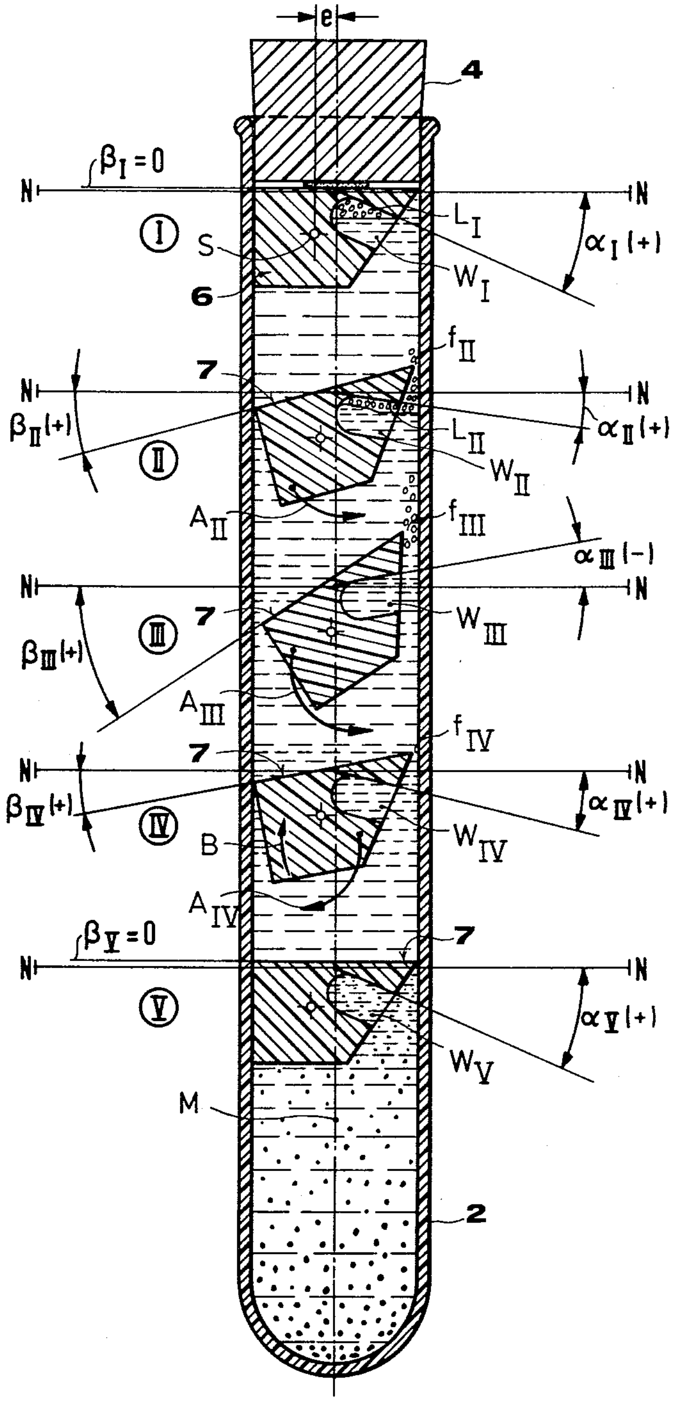
Figure 5:
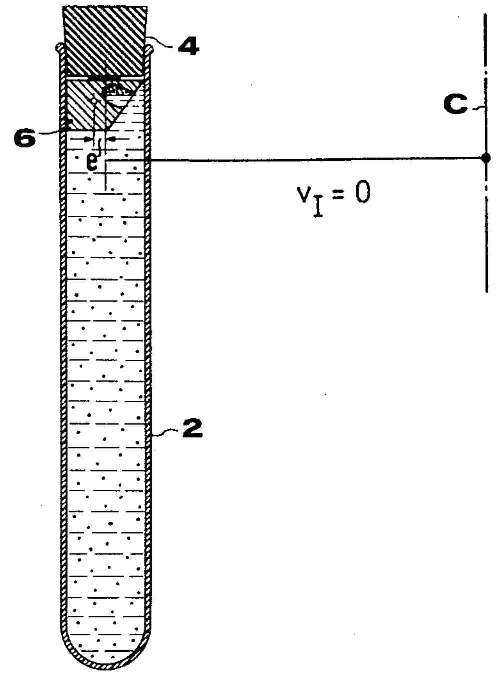
FIGS. 5 to 7 show the absolute position of separating tube 2 in a centrifuge, the same parts once again being designated by the same references.
Figure 6:
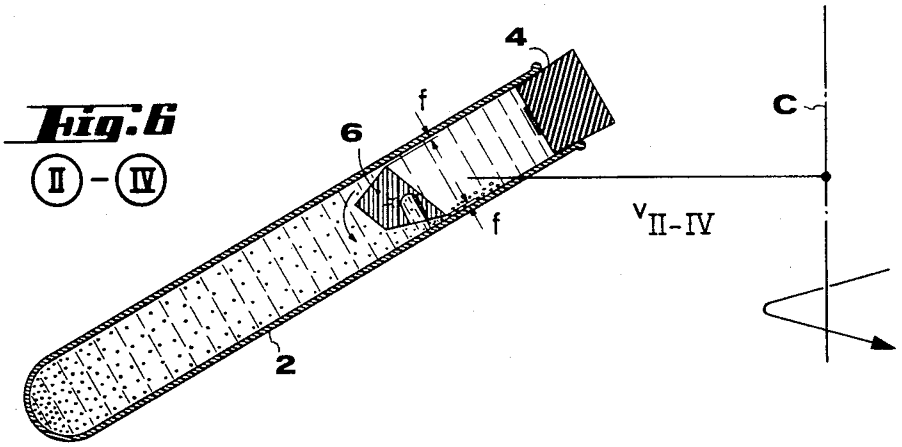
Figure 7:
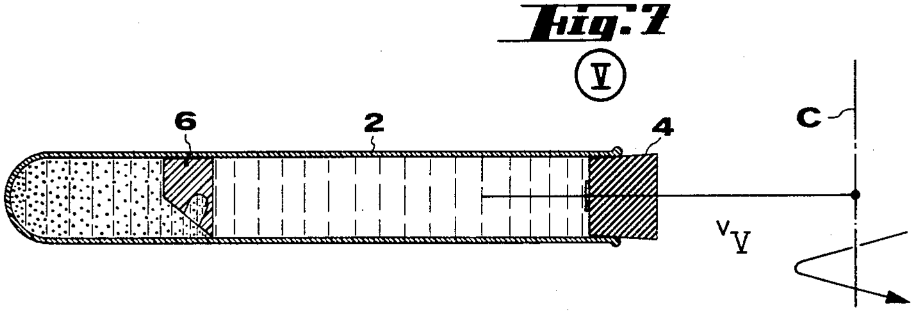

Finally, FIG. 7 shows the end position of separating tube 2 achieved at maximum centrifuging speed $V_V$ and which corresponds to the separating member position in FIG. 4V.

Figure 8:
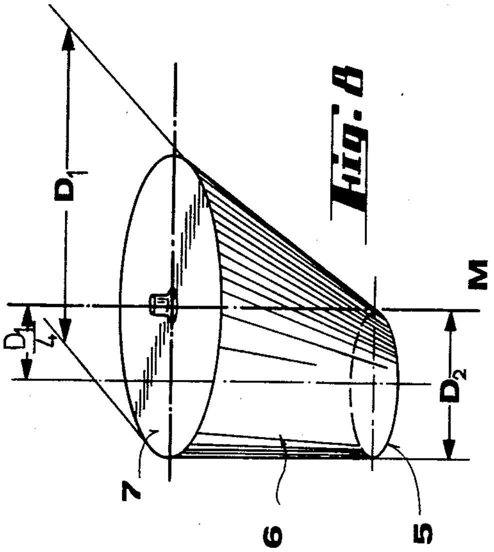

FIG. 8 is a perspective view of separating member 6 clearly showing top surface 7 with its diameter $D_1$ and bottom surface 5 with its diameter $D_2$. A predetermined breaking point 6 is shaped in the centre of the circular, planar top surface 7 by means of which separating member 6 follows onto a piston rod 15 indicated in FIG. 9. The separating tube axis M passes through the centre of the top surface 7 and consequently through the predetermined breaking point 16. The centre of the circular bottom surface 5 is displaced by $D_1/4$ with respect to the centre of top surface 7, i.e. by half the radius of the latter, so that in plan view bottom surface 5 extends from one edge of top surface 7 to the predetermined breaking point 16 located in its centre. This leads to the shape, apparent from FIG. 9, of a right-angled trapezium with a generatrix parallel to the wall of separating tube 2. Separating member 6 can also be used as a piston or plunger for the suction of blood and, in the aforementioned manner, is shaped on a piston rod 15 by means of a predetermined breaking point 16 in the manner indicated hereinbefore. After drawing up blood into separating tube 2, whose underside is provided for this purpose with a sealable cannula cone 18 not shown in FIG. 9 but clearly visible in FIG. 10, piston rod 15 is broken off by clockwise bending or breaking off, separating member 6 being supported against the wall of separating tube 2.

Figure 9:
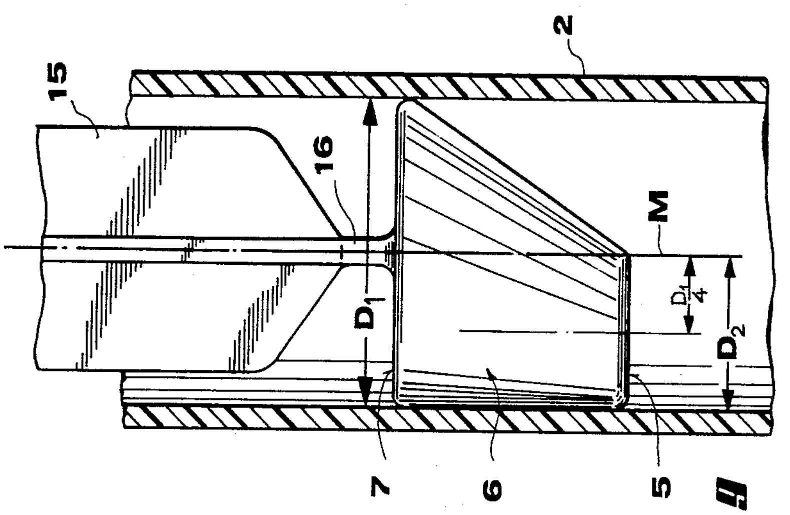

In the case of separating member 6 of FIGS. 9 and 8, no bouyancy chamber is provided, but it is obvious that the separating member shaped onto a piston rod can also be equipped with a bouyancy chamber according to FIGS. 1 to 7.

Figure 10:
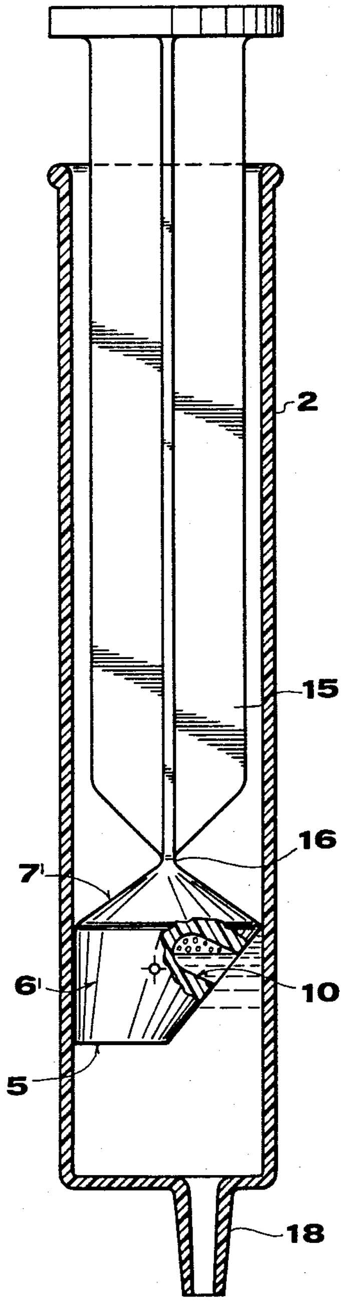
Figure 11:
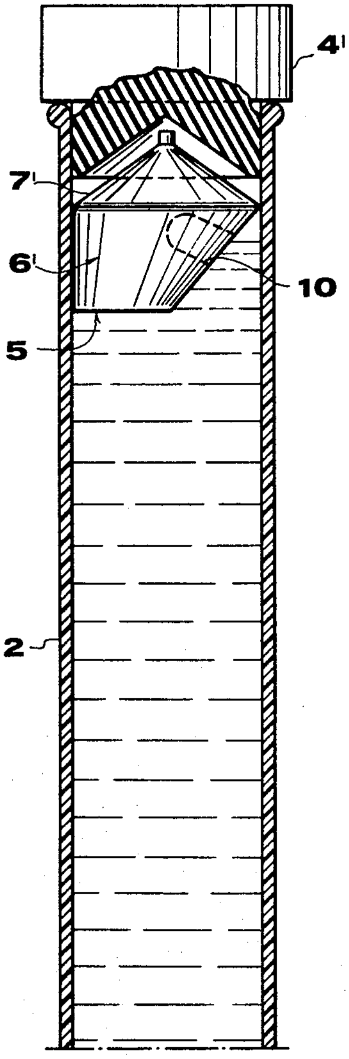

FIGS. 10 and 11 show a different construction of separating member 6' connected by means of a conical top surface 7' to piston rod 15. The same parts are once again given the same references. A predetermined breaking point 16 is once again provided at the tip of the conical top surface 7'. Separating member 6' has at least one bouyancy chamber 10, represented in part sectional form in FIG. 10. In FIG. 11, the bouyancy chamber 10 is indicated by a dot-dash line. The separating tube according to FIG. 10 has on its bottom a cannula cone 18 through which can be sucked the blood or the liquid to be separated. After raising separating member 6', the piston rod 15 is broken off in the previously described manner and the top of the separating tube 2 is sealed by its overlapping stopper 4'. The cannula core 18 is also closed by a cover or cap, which is known per se, but not shown for reasons of clarity.

FIG. 11 shows the broken-off separating member 6' in the initial position, as well as the stopper 4' provided with a conical depression corresponding to top surface 7'.

Figure 13:
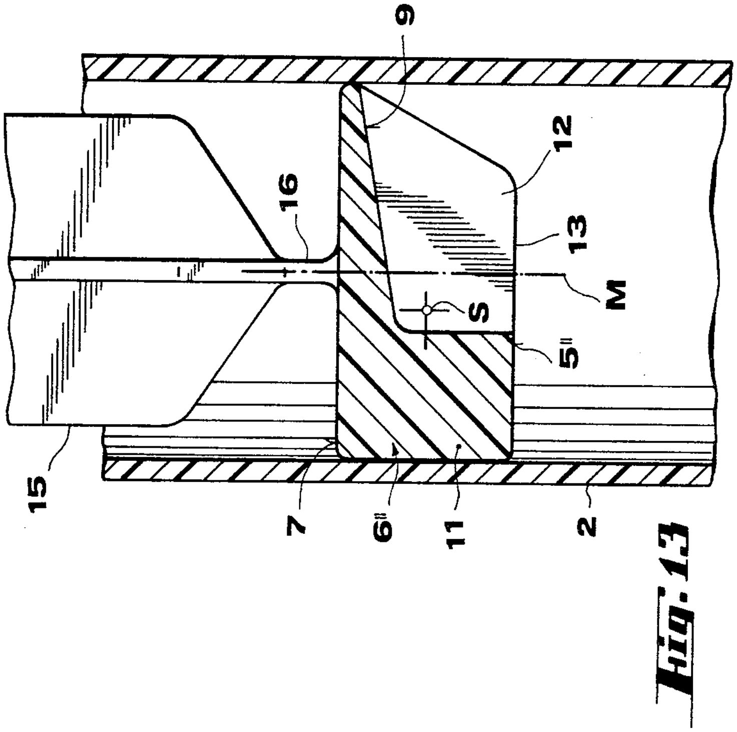
Figure 12:
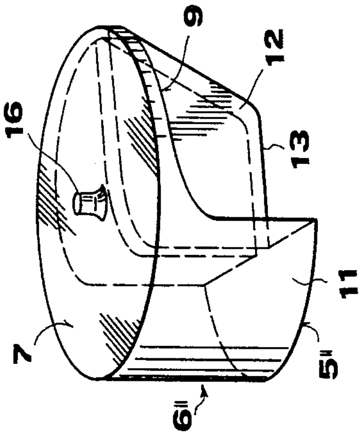

FIGS. 12 and 13 show a further construction of the separating member, the same parts once again being indicated by the same references. The modified separating member is designated 6" and has a circular top surface 7, onto which follows a cylindrical portion 11. The circumference of the cylindrical portion 11 is shorter than half a circumference, so that the greatest width of portion 11 is smaller than the diameter of top surface 7 and consequently separating tube 2. This makes it possible to tilt separating member 6" in separating tube 2 in a counterclockwise direction according to FIG. 13.

FIG. 13 shows separating member 6" in section, it being clear that the underside 9 of top surface 7 runs in an inclined manner from the wall of separating tube 2 to the bottom surface 5″ of separating member 6″ and with the top surface 7 forms an angle of e.g. 5 to 20 and preferably 10°. As a result, air trapped under the top surface 7 can escape from the underside 9 of separating member 6″ on tilting the latter. Beneath free top surface 7 is also provided a separating wall 12, whose lower edge 13 ends at a distance from the wall of separating tube 2 and consequently prevents overturning of separating member 6″ during centrifuging. Thus, in elevation, separating member 6″ has approximately the outer contour of separating member 6 shown in FIGS. 1 to 9. Once again, separating member 6″ is shaped onto a piston rod 15 by means of a predetermined breaking point 16 and can be broken off therefrom by bending away the piston rod 15 after drawing up the blood or the liquid to be separated. In FIG. 13, breaking off takes place by moving piston rod 15 in a clockwise direction, so that cylindrical portion 11 is supported on the wall of separating tube 2 and forms a bearing block.

FIGS. 14 and 16 show a further embodiment of the invention with a conical separating member 6‴, whose tip is once again shaped by means of a predetermined breakingpoint 16 on a piston rod 15 which can be broken off. The same parts are once again given the same references in these drawings. The conical separating member 6‴ therefore has a conical top surface 7‴, whose largest external diameter corresponds to the internal diameter of separating tube 2. The conical top surface 8‴ is followed by a domed bottom surface 5‴, which in the represented embodiment is a spherical portion. The largest diameter of spherical portion $D_1$ is shown in broken line form in FIG. 14 and corresponds to the internal diameter of separating tube 2. The height of the top surface cone from its base containing diameter $D_1$ to the tip formed by the predetermined breaking point 16 is somewhat less than half the internal diameter $D_1$ of the separating tube 2, so that after breaking away from piston rod 15 during centrifuging, separating member 6‴ can completely revolve (cf FIG. 15). At least one bouyancy chamber 10‴ is also eccentrically arranged in the domed bottom surface 5‴, so that the centre of gravity S is once again positioned eccentrically with respect to the separating tube axis M. On drawing up the liquid to be separated, air can be enclosed in bouyancy chamber 10‴, which aids an overturning of separating member 6‴ during centrifuging. FIG. 15 shows the overturned separating member 6‴ after breaking off and now the domed bottom surface 5‴ points upwards. As bouyancy chamber 10‴ is also open at the top, no air remains enclosed.

For breaking separating member 6‴ off from piston rod 15, two tori 20, 21 are provided aththe upper end of separating tube 2 and are spaced in such a way that they jam separating member 6‴ on the periphery. The outer torus 20 is larger in the radial direction of separating tube 2, so that a removal of separating member 6‴ from tube 2 is considerably impeded. The inner torus 21 is somewhat smaller, so that separating member 6‴ can move over said torus during pulling up. The two tori 20, 21 form a bearing block for separating member 6‴ for breaking off piston rod 15. Separating member 6‴ is thereby in the position indicated by dot-dash lines in FIG. 14.

The inner and outer tori 20, 21 are, according to one embodiment, positioned at one end of separating tube 2 and in this case a stopper which externally engages round tube 2 is chosen. Such a stopper is not shown for reasons of clarity, but it is obvious to the Expert how such a stopper can be constructed. In another, not shown embodiment, the two tori are spaced from the end of the separating tube, so that the latter can be sealed by a stopper 4 or 4′ represented in the preceding drawings.

FIG. 16 shows the conical separating member 6‴ broken off from the piston rod in a perspective view, it also being possible to see the edge of bouyancy chamber 10‴.

According to another, not shown embodiment, the separating member according to FIGS. 14 to 16 is a solid member without a bouyancy chamber, the revolving or tilting over of the separating member taking place solely as a result of its unstable position after breaking off from the piston rod.

According to another, not shown embodiment, the separating member has roughly the shape according to FIG. 15, its top surface being domed and its bottom surface conical. In this case, the domed top surface is connected, prior to centrifuging, to a stopper by means of a connecting member or is shaped by means of a predetermined breaking point onto a piston rod. This separating member with a domed top surface and conical bottom surface can once again have one or more bouyancy chambers through which the previously enclosed air can reliably escape during centrifuging. Appropriate embodiments for the bouyancy chambers are described relative to FIGS. 1 to 11.

It falls within the scope of the invention in the case of a cross-sectionally quadrilateral separating tube to construct the separating member in trapezoidal or triangular manner, so that once again in the rest state the complete cross-section of the separating tube is blocked, whereas during centrifuging there is tilting of the separating member and consequently a gap is formed.

I claim:

1. Separating member in a separating tube for the centrifugal separation of a liquid containing at least two components, which has a top surface and a bottom surface and is made from inelastic material, particularly inelastic plastic material, whose specific gravity is between that of the components to be separated and which in the rest state seals the cross-section of the separating tube, characterized in that the centre of gravity (S) of the separating member (6–6‴) is arranged eccentrically with respect to its central axis (M) and that due to its shape, during centrifuging, the separating member (6–6‴) can only be tilted in the separating tube (2) in such a way that a gap (f) is formed between the largest circumference ($D_1$) of the separating member (6–6‴) and the inner wall of the separating tube (2).

2. Separating tube according to claim 1, characterized in that the separating member (6) is shaped like an asymmetrical frustum, whose largest diameter $D_1$ is twice as large as its smallest diameter ($D_2$), the two diameters $D_1$ and $D_2$ being connected by a generatrix of the separating member (6) positioned vertically on both the largest diameter $D_1$ and the smallest diameter $D_2$.

3. Separating tube according to claim 1, characterized in that the separating member (6″) is in the shape of a cylindrical portion with a circular top surface (7) under whose free end is provided a separating wall (12) preventing an overturning of separating member (6″).

4. Separating tube according to claim 3, characterized in that the underside (9) of the top surface (11) is inclined from its free end to the bottom surface (5″) of separating member (6″).

5. Separating tube according to claim 1, characterized in that the separating member (6‴) is shaped like a cone with a rounded bottom surface (5‴).

6. Separating tube according to claim 5, characterized in that the predetermined breaking point (16) is shaped into the rounded bottom surface (5‴).

7. Separating tube according to claim 1, characterized in that the separating member (6, 6″) has a conical top surface (7′).

8. Separating tube according to any one of the claims 1 to 5 and 7, characterized in that the separating member (6–6‴) is shaped onto a piston rod (15) by a predetermined breaking point (16).

9. Separating member according to claim 8, characterized in that the predetermined breaking point (16) is located on the planar top surface (7) of separating member (6) containing the largest diameter $D_1$.

10. Separating tube according to claim 8, characterized in that the predetermined breaking point (16) is located at the tip of the conical top surface (7′, 7″).

11. Separating tube according to one of the claims 1 to 5 and 7, characterized in that the separating member (6–6‴) has at least one eccentrically arranged bouyancy chamber (10).

12. Separating tube according to claim 1, characterized in that the separating member (6–6‴) is made from polystyrene.

* * * * *